Nov. 12, 1940. F. S. HODGMAN 2,221,311
AUTOMATIC STEERING FOR SHIPS AND OTHER CRAFT
Original Filed April 13, 1935  2 Sheets-Sheet 2
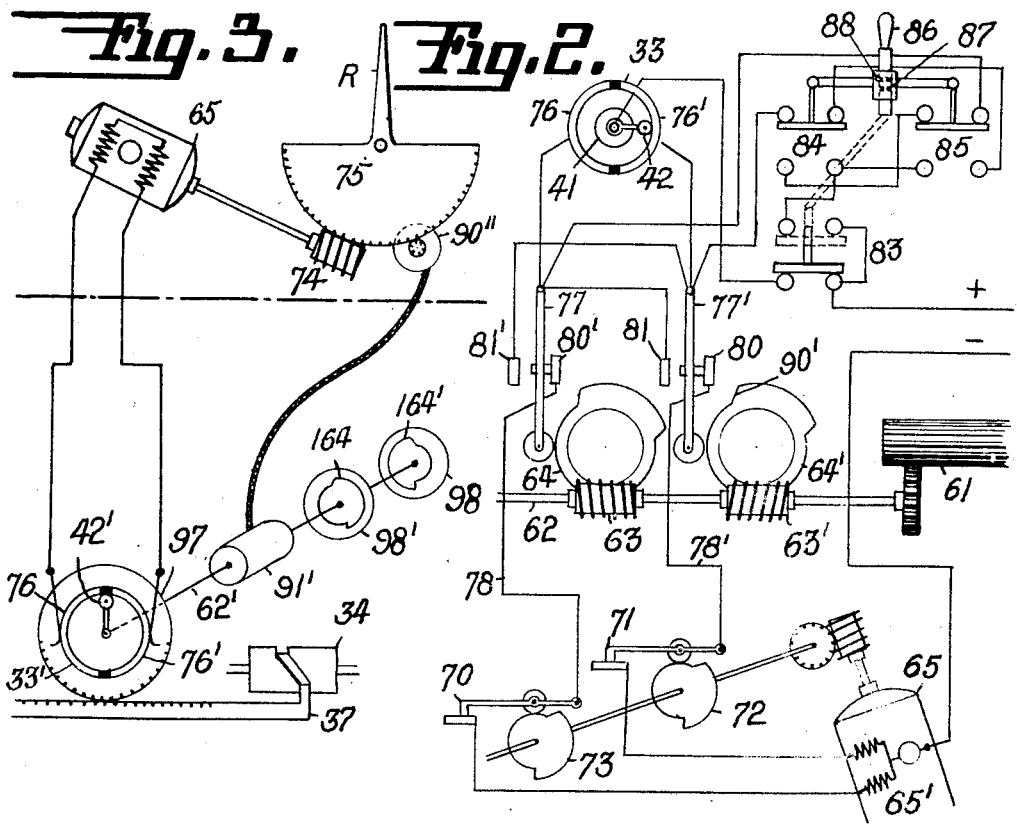
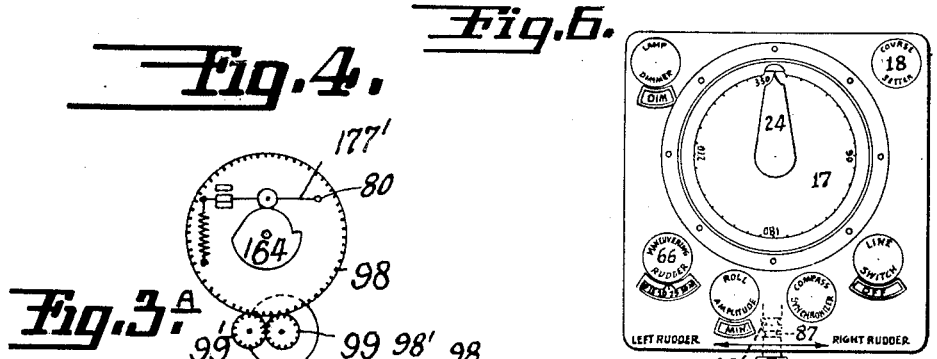
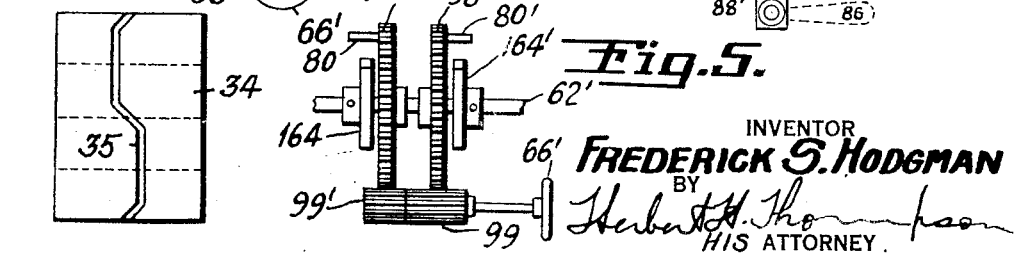
INVENTOR
FREDERICK S. HODGMAN
BY Herbert H. Thompson
HIS ATTORNEY.

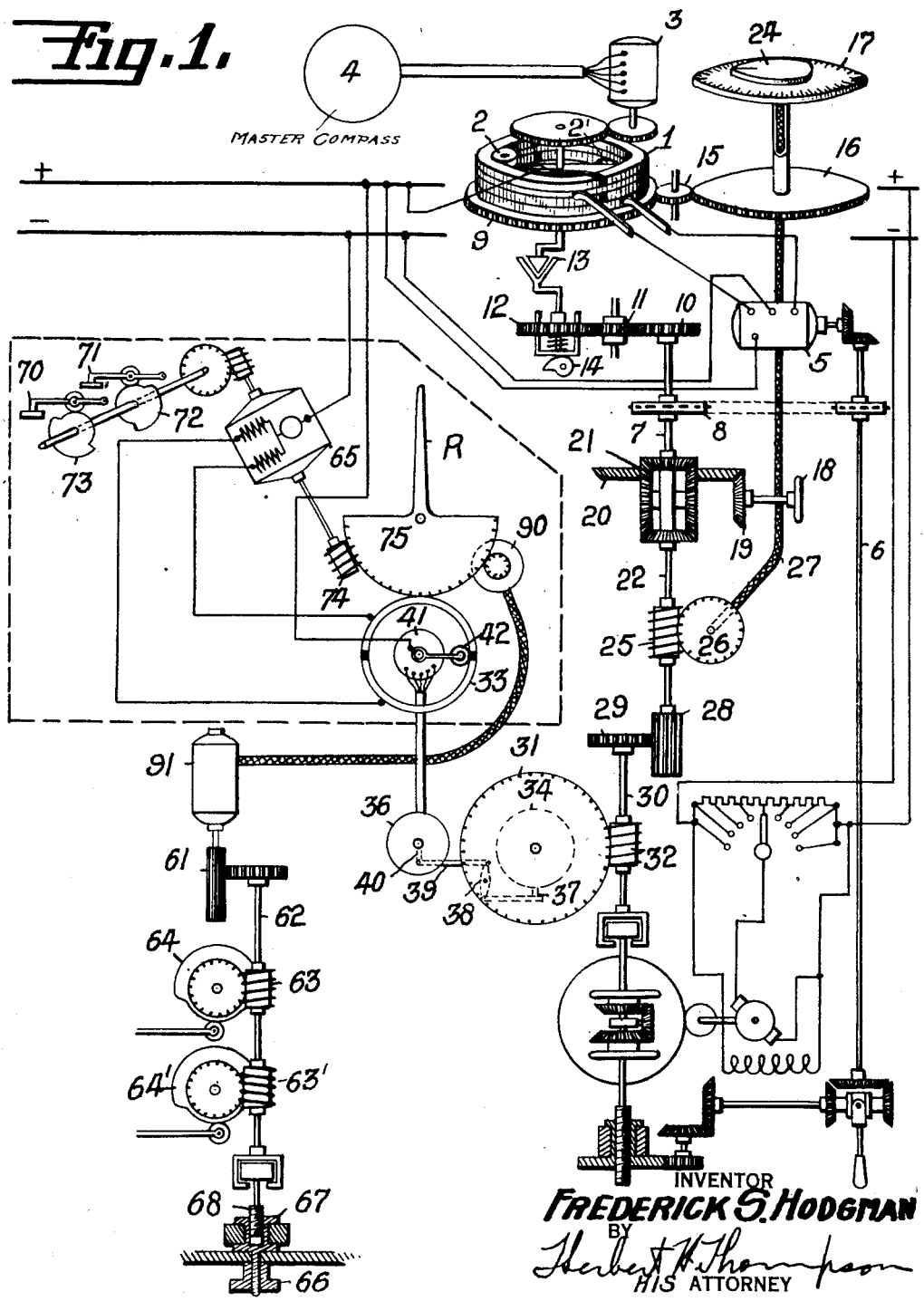

Patented Nov. 12, 1940

2,221,311

UNITED STATES PATENT OFFICE 2,221,311

AUTOMATIC STEERING FOR SHIPS AND OTHER CRAFT

Frederick S. Hodgman, Glen Rock, N. J., assignor to Sperry Gyroscope Company, Inc., Brooklyn, N. Y., a corporation of New York Original application April 13, 1935, Serial No. 16,173, now Patent No. 2,120,950, dated June 14, 1938. Divided and this application November 2, 1937, Serial No. 172,320

4 Claims. (Cl. 172—282)

This invention relates to automatic steering devices for ships or other dirigible craft, the present application being a division of, my prior application of like title, now Patent No. 2,120,950, dated June 14, 1938.

The present application relates particularly to a means for controlling the total rudder throw from the pilot house regardless of the total amount of turn set into the course change device of the automatic steering device.

With the ordinary automatic steering device, if a large course change is set into the mechanism, the rudder will be thrown hard-over, but this is not always desirable, especially where ships are maneuvering in formation, where a given rate of turn may be desired. According to the present invention, means are provided which are controllable from the pilot house for limiting the rudder thrown to any desired amount.

Referring to the drawings, disclosing several forms my invention may assume,

Fig. 1 is a diagrammatic view and partial wiring diagram of my invention, showing its relation to the other parts of the automatic steering gear of the type shown in my aforesaid patent application.

Fig. 2 is a wiring diagram of the limit switches and control motor for the rudder.

Fig. 3 is a diagram of a modified form of limit switch device. Fig. 3—A is a developed diagram of the cam in Figs. 1 and 3.

Figs. 4 and 5 are details of Fig. 3.

Fig. 6 is a top view of a ship's steering stand, showing various setting and control knobs thereon.

My invention is shown as applied to the type of sensitive automatic steering device shown in my prior Patent #1,965,378, dated July 3, 1934, in which a small auxiliary follow-up motor is used between the compass actuated controller and the main controller which operates the rudder motor. In the drawings, the compass actuated controller 1 is shown as one or more concentric rings on which a trolley or trolleys 2, on a rotatable arm, bear. In this instance the trolley arm is shown as turned from a repeater motor 3 actuated from a master compass 4. The rings are substantially semicircular and the two halves insulated from each other. The rings are mounted for rotation about the axis of rotation of the trolley arm and are rotated from a follow-back connection from an auxiliary motor 5 which is actuated from the controller and which actuates the main controller 33 and a follow-back connection to auxiliary controller 1.

As shown, the motor 5 turns a shaft 6 through suitable gearing, which shaft in turn is connected to a shaft 7 through sprocket and chain gearing 8. The shaft 7, in turn, is shown as actuating a gear 9, on which said controller rings are mounted through pinion 10, idler 11, gear 12 and variable lost motion device 13, the position of which may be adjusted by a cam 14. The gear 9 may also actuate an idler 15 and large gear 16, which turns a compass card 17.

Course changes may be interposed by means of a course changing knob 18 which actuates, through bevel gears 19 and 20, one arm of a differential gear train 21. A shaft 22 is connected to the arm of the gear train opposite the shaft 7, and will therefore be actuated both from the follow-up from the motor 5 and the course changing knob 18, but the card 17, being unaffected by said knob, will show true compass headings. An additional ship's heading indicator 24 may be provided above the card 17 and actuated from the shaft 22 through any suitable gearing, such as worm 25, worm wheel 26 and flexible shaft 27.

The shaft 22 also turns, through an elongated pinion 28, a gear 29 on shaft 30, which turns at reduced speed a worm wheel 31 through a worm 32. The gearing is such that the worm wheel 31 makes one revolution for one complete turn of the ship and is therefore at all times synchronous with the ship and is used as the means for actuating the main controller 33. To this end there is shown a cam 34 on the shaft of said gear, which is provided with a slot 35, which is shown developed in Fig. 3—A. This slot oscillates a self-synchronous transmitter 36 through an angle preferably somewhat less than 180° for one revolution of the gear 31 through suitable linkage, such as a link 37 having a pin at one end engaging said slot and connected at its opposite end to a pivoted lever 38 which reciprocates link 39 connected to an arm 40 on the shaft of the transmitter. Said transmitter actuates a self-synchronous repeater motor 41 at the after end of the ship, which turns the motor contacts 42 of the main controller 33.

I provide a means on the bridge for limiting the amount of rudder angle in order that the ship may be made to turn through large angles with less rudder than hard-over, thus limiting the rate of turn. To this end I have shown a transmitter 90 at the rudder which actuates a repeater motor 91 on the bridge to turn directly or indirectly an elongated pinion 61 which turns a shaft 62. Said shaft is shown as provided with a pair of oppositely threaded worms 63 and 63' which revolve cams 64 and 64' in opposite directions. Normally, these cams are arranged so that one will open the circuit of the main steering motor 65 when the rudder limit is reached in one direction, while the other opens the circuit for the other extreme position of the rudder, but it will readily be apparent that by changing the relative position of the cams with respect to the rest of the system, the rudder angle may be altered. This may be conveniently accomplished by means of a maneuvering rudder knob 66 which turns a nut 67 threaded on a short shaft 68 so as to advance or retract such shaft, and with it move axially shaft 62, thereby displacing the cams 64 and 64' in the same direction. As will be apparent from Figs. 1 and 2, this has the effect of altering the rudder throw in both directions at the same time, since the two cams are normally revolved in opposite directions by the rotation of the shaft 62.

The limit switch, as shown, is novel in the sense that it cooperates with controller 33 to provide a two part remote control of a distant object, such as the rudder. It provides two-way remote control, whereby the rudder may be returned to lesser angles at will, as well as increased to greater angles.

The main controller at the after end actuates the main reversible motor 65 directly, but I prefer to also employ limit switches 70 and 71 at the rudder which remain fixed, the cams for operating the same, 72 and 73, being actuated directly from the motor shaft.

The motor is shown as turning the rudder R directly through worm 74 and worm sector 75, but it will be understood that if desired, any suitable steering engine may be interposed. The follow-back connection from the rudder to the main controller is represented as effected from sector 75 on the rudder, which is shown as turning the follow-up rings 33 of the controller through a gear (not shown).

Referring now to the wiring diagram in Fig. 2, showing the main controller and motor circuits, the two rings 76 and 76' of the main controller are connected to contact arms 77 and 77', said arms having rollers thereon adapted to be engaged by the cams 64 and 64'. When disengaged, the circuit is completed through each of wires 78 and 78' through the main limit switches 70 and 71 and through the oppositely wound field coils 65' of the motor 65, so that the motor will be driven in one direction or the other, depending upon whether the trolley 42 is on segment 76 or 76'. Assuming the motor to be running in a direction to rotate the cam 64' to the left, it will be seen that the circuit will be broken at switch 80 by the opening of the switch arm 77' if said cam strikes the arm before the switch 71 is opened, the cam then resting on inclined surface 90'. If, however, the pilot then desires to turn the rudder back part way, he turns knob 66 further, which will cause the roller to ride on top of cam 64' and complete contact 81, which will excite the opposite motor field through switch arm 77 and contact 80'.

The group of switches 83, 84 and 85 are actuated from the auxiliary hard-over steering handle 86. When this handle is down, the automatic steering gear is functioning and the switch 83 is closed to the position shown in Fig. 2. When, however, it is desired to steer by hand, the handle is pulled upwardly to bring notch 87 under the ball 88, thereby moving the switch 83 upwardly into the dotted line position (Fig. 2). In this position the movement of the handle 86 to the right or left operates the switches 84 and 85 to steer the ship through the same electric steering motor 65 as employed when steering the ship automatically.

A further slight modification is shown in Figs. 3, 4 and 5 in connection with the method of actuating the limit cams 164 and 164' on the bridge. According to this modification, the main controller 33' is placed at the control device in the pilot house instead of aft and a follow-back connection is provided between the rudder and the controller by means of transmitter 90'' at the rudder and repeater motor 91' which not only drives the limit cams 164 and 164' through shaft 62', but also provides a follow-up connection to the controller by turning the trolley 42. The contact rings in this instance are shown as turned from the cam 34 by means of the rack 20 bar 37, the teeth of which mesh with the gear 97 on which the contact segments are mounted. In this case the variation in the position of the limit cams is shown as effected by pivotally mounting the contact arms 177' on gears 98 and 98' on fins 80 and 80', respectively, so that said contact arms may be rotated with respect to the cams by means of the adjusting knob 66'. Said knob operates to turn said gears in opposite directions through intermeshing pinions 99 and 99'.

The pilot house limit switches 64 and 64' are advantageous when a fleet is maneuvering in formation and it is desired that the ships make a turn at a predetermined rate. By setting the rudder limit switches, the rate of turn may be limited even though a large turn of, say, 180° is signalled and set on the controller by knob 18.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an electric steering device for ships, a pilot house controller of the follow-up or proportional rudder type, means for altering the setting thereof to cause a predetermined change in course, a rudder, a motor for turning the rudder, limit switches in the circuit of said motor at the motor for limiting the maximum rudder throw, auxiliary limit switches at the controller, and means for adjusting the latter switches in the circuit of said motor to limit the rudder throw to a predetermined angle regardless of the amount of course change set on said controller.

2. In an automatic steering gear for ships, a compass governed follow-up controller, means for setting any desired change in course on said controller, a rudder, limit switches at said controller for limiting the rudder throw independently of said controller, and means for adjusting said switches at will to control the rate of turn of the ship.

3. In an electric steering device for ships, a pilot house controller, a rudder, means for setting thereon any predetermined course change, a motor for turning the rudder, limit switches in the circuit of said motor at the motor for limiting the rudder throw, auxiliary limit switches in the circuit of said motor at the controller, means for adjusting the latter switches to limit the rudder throw regardless of the amount of turn set on said controller, and means whereby the rudder throw so limited may be increased or diminished by resetting said auxiliary limit switches.

4. In an automatic steering gear for ships, a rudder, a motor for turning said rudder, a compass governed follow-up controller for said motor, hand means for setting any desired change in course, hand operated on-off controller means for said motor adjacent said setting means, means rendering either of said controllers operative at will to the exclusion of the other, limit switches in the circuit of said motor at the motor for limiting the maximum angle of rudder throw, other limit switches in the circuit of said motor adjacent said two hand means for controllably limiting the rudder throw to an angle less than said maximum, regardless of which controller is operating, and means adjacent said two hand means for adjusting said other limit switches.

FREDERICK S. HODGMAN.